United States Patent [19]

Persson

[11] 4,203,651
[45] May 20, 1980

[54] OPTICAL APPARATUS FOR VARYING FOCAL POWER ALONG ONE PRINCIPAL MERIDIAN WHILE MAINTAINING CONSTANT FOCAL POWER ALONG THE OTHER PRINCIPAL MERIDIAN

[75] Inventor: Staffan B. Persson, Kenmore, N.Y.

[73] Assignee: American Optical Corporation, Southbridge, Mass.

[21] Appl. No.: 710,772

[22] Filed: Aug. 2, 1976

[51] Int. Cl.² .................... G02B 15/00; G02B 13/08
[52] U.S. Cl. ................................. 350/181; 350/187
[58] Field of Search ................... 350/181, 187, 190

[56] References Cited

U.S. PATENT DOCUMENTS

| | | | |
|---|---|---|---|
| 2,782,683 | 2/1957 | Walker | 350/187 |
| 3,051,051 | 8/1962 | Jeffree | 350/181 |
| 3,317,735 | 5/1967 | Elsässer | 350/190 |
| 3,485,554 | 12/1969 | Hemstreet | 350/181 |
| 3,664,631 | 5/1972 | Guyton | 351/27 |

Primary Examiner—John K. Corbin
Assistant Examiner—Rodney Bovernick
Attorney, Agent, or Firm—Jeremiah J. Duggan; Alan H. Spencer; Stephen A. Schneeberger

[57] ABSTRACT

An apparatus, including a pair of spaced-cylinder lenses having their cylinder axes in one plane with a third cylinder lens slideably mounted on a carriage therebetween and having its cylinder axis positioned normal to the plane, permits the focal power in one principal meridian to be continuously varied by moving the carriage with the third cylinder lens. The lenses are supported by a rotatable assembly and the slideable carriage is supported by a track running parallel to the optical axis.

4 Claims, 5 Drawing Figures

OPTICAL APPARATUS FOR VARYING FOCAL POWER ALONG ONE PRINCIPAL MERIDIAN WHILE MAINTAINING CONSTANT FOCAL POWER ALONG THE OTHER PRINCIPAL MERIDIAN

BACKGROUND OF THE INVENTION

This invention relates to a device for varying focal power along one principal meridian and maintaining a fixed focal plane along the other principal meridian of an optical system. More particularly, the invention relates to such a device having utility in ophthalmic instruments.

U.S. Pat. No. 3,669,530 issued June 13, 1972 to Guyton describes a device for varying cylinder power in an optometer showing arrangements where two cylinder lenses are used in a device to vary the cylinder power. However, the device requires at least two separately moveable segments, i.e. two cylinder lenses or a cylinder lens and a target.

U.S. Pat. No. 3,664,631 issued May 21, 1972 to Guyton describes an optometer having a plurality of cylinder lenses which are slideable along the optical axis. In FIG. 2, believed to be the most pertinent, the center cylinder lens of a three-cylinder lens system is independently moveable within the slideable three-lens system.

The present invention relates to an apparatus which permits variation in the focal power along one principal plane while maintaining a fixed focal plane along the other principal plane. The present invention further permits rotation of the optical assembly for selectively orienting the principal plane having variable focal power.

PREFERRED EMBODIMENT

Figure 1:
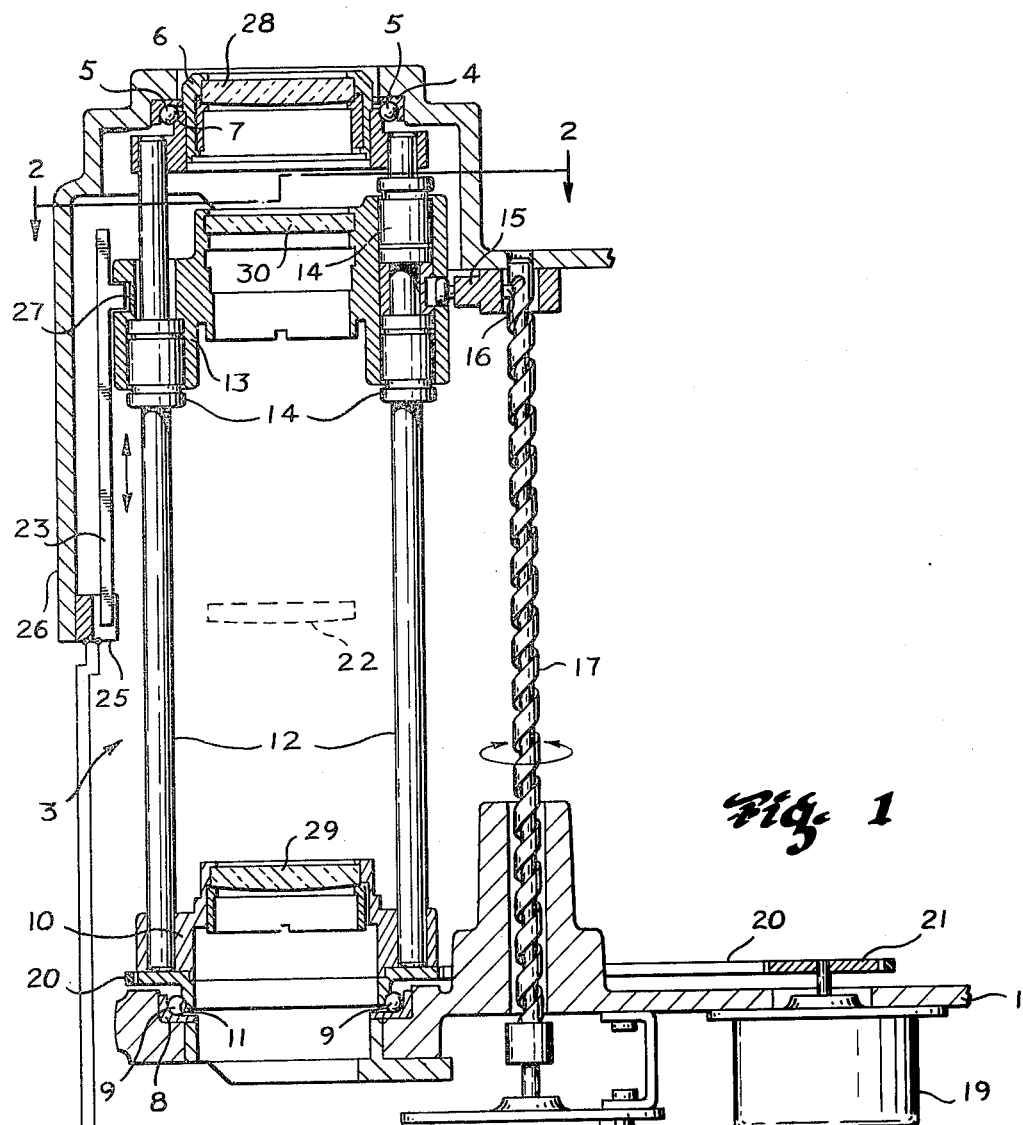
FIG. 1 is a side view, partly in section, of the preferred embodiment of the present invention.
Figure 2:
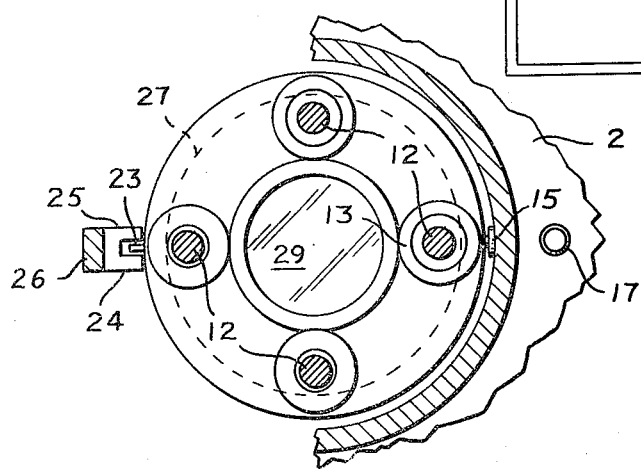
FIG. 2 is a top view in section along line 2—2 of FIG. 1.

Referring to FIG. 1, a device having a frame with lower frame portion 1 and upper frame portion 2 has an optical assembly designated generally by 3. The upper frame portion 2 has outer race 4 positioned therein. Ball bearings 5 rotatably support upper lens mount 6 by inner race 7. Lower frame portion 1 supports outer race 8. Ball bearings 9, in conjunction with outer race 8, rotatably position lower lens mount 10 by inner race 11. Shafts 12 connect upper lens mount 6 and lower lens mount 10 to maintain a fixed spacing therebetween and join the lens mounts for concurrent rotation thereof. Carriage 13 is slideably mounted by bearings 14 on shafts 12. Follower 15 has pin 16 operatively engaging threaded shaft 17. Threaded shaft 17 is rotated in either direction by cylinder motor 18 to selectively move carriage 13 along shafts 12. Axis motor 19 rotates optical assembly 3 via belt 20 and pulley 21 to selectively position the principal meridians.

The apparatus described above carries a pair of cylinder lenses 28 and 29 having a combined focal power in a principal meridian. Cylinder lens 30 has a cylinder power equal to the combined cylinder power of lenses 28 and 29 in a principal meridian normal to the principal meridian of lenses 28 and 29. For example, cylinder lens 30 may have a cylinder power of 3 diopters; cylinder lens 28 has a cylinder power of about 1.5 diopters and cylinder lens 29 has a cylinder power of about 2 diopters. The focal power in the principal meridian of cylinder lens 30 is varied by movement of carriage 13 along shafts 12. A reference position 22 designates the location of cylinder lens 30 when the focal power in both principal meridians is the same. As cylinder lens 30 moves away from reference position 22, the power along its principal meridian is continuously increased.

Figure 3:
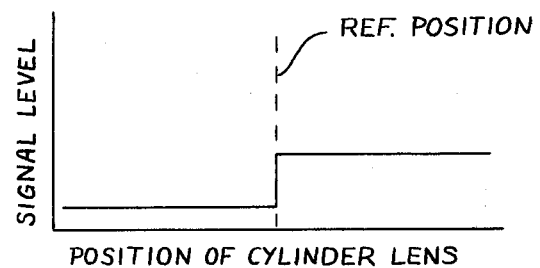
FIG. 3 is a graphic representation of signal level generated by a detector in the device.

It is frequently desirable to be able to return a member moveable in either direction along a path to a reference position. Referring again to FIG. 1, reference position 22 represents a chosen position to which it is frequently desired to return lens 30. Occluder 23 is connected to follower 15 which engages groove 27 in carriage 13 to permit rotation of optical assembly 3. Occluder 23 extends parallel to the path traveled by carriage 13 along shafts 12. An energy beam such as that from IR emitter 25 is positioned on support 26 adjacent to the path traveled by occluder 23. Detector 24 is positioned by support 26 on the opposite side of the path traveled by occluder 23. The energy beam emitted by IR emitter 25 is blocked by occluder 23, if cylinder lens 30 is above reference position 22. If cylinder lens 30 is below reference position 22, detector 24 produces a signal generated by the unoccluded light beam. FIG. 3 is a graphic representation of the signal produced by detector 24 plotted against the position of cylinder lens 30. When cylinder lens 30 is positioned above reference position 22 and the control is activated to return cylinder lens 30 to the reference position, the control means will direct motor 18 to rotate counterclockwise because the light beam is blocked by occluder 23 until detector 24 receives light from emitter 25. A signal indicating light is being received by detector 24 which causes the control to stop motor 18. When cylinder lens 30 is below reference position 22 and the control is activated to return cylinder lens 30 to the reference position, the presence of a signal from detector 24 is acted upon by the control to direct motor 18 to run clockwise driving cylinder lens 30 toward reference position 22. As soon as the light beam from IR emitter 25 is interrupted by occluder 23, the control stops motor 18. Thus, activation of the control will directly return cylinder lens 30 to the reference position from any position of carriage 13 along shafts 12.

ALTERNATE EMBODIMENT

Figure 5:
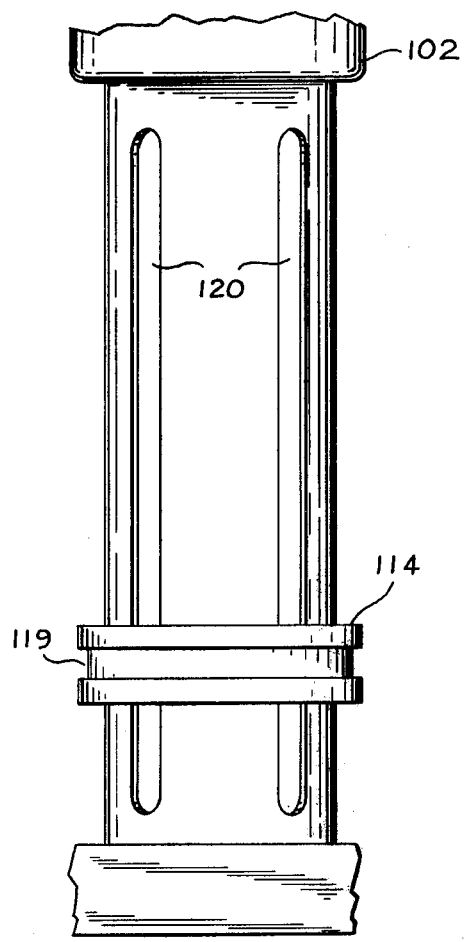
FIG. 5 is a side plan view of the embodiment of FIG. 4.
Figure 4:
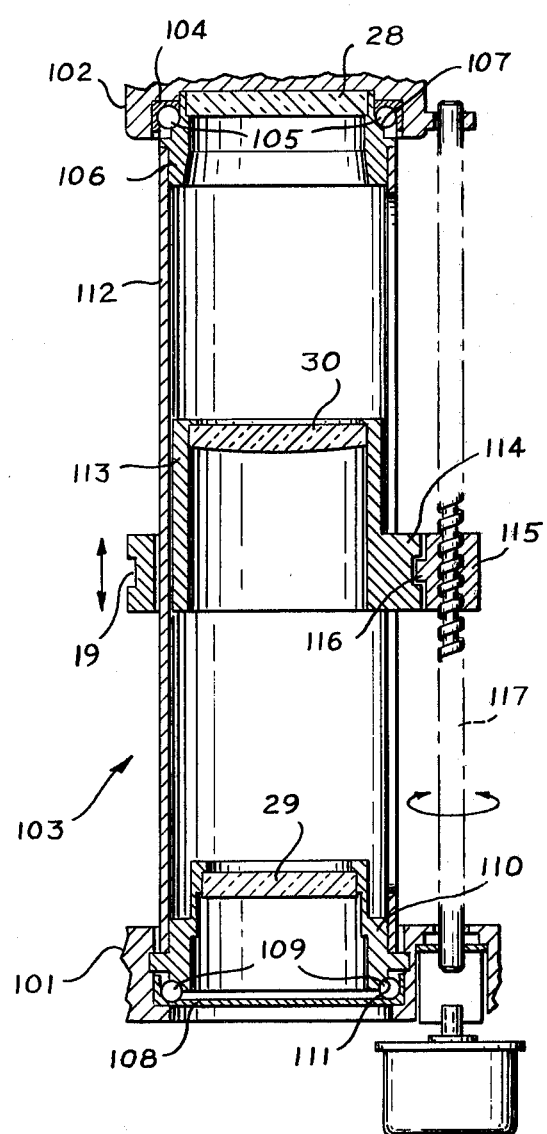
FIG. 4 is a side view of a second embodiment, shown partly in section.

Referring to FIGS. 4 and 5, lower frame portion 101 has an outer race 108 which supports optical assembly 103 by ball bearings 109 which carry lower lens mount 110 by a machine surface 111 acting as an inner race. Upper frame portion 102 supports the opposite end of optical assembly 103 by outer race 104 in combination with ball bearings 105 and upper lens mount 106 with machine surface 107 acting as an inner race. Upper lens mount 106 is joined to lower lens mount 110 by cylinder 112 which maintains constant spacing between the lens mounts and provides concurrent rotation thereof. Carriage 113 is slideably mounted in cylinder 112. Follower 115 engages ring 114 which is connected to carriage 113 through slots 120. As optical assembly 103 is rotated, groove 119 in ring 114 engages pin 116 to slide carriage 113 in cylinder 112 as follower 115 is moved by threaded shaft 117. Threaded shaft 117 is turned rotatably in either direction by cylinder motor 118.

What is claimed is:

1. Apparatus for varying focal power along one principal meridian and having a fixed focal power along the other principal meridian in an optical system which comprises a stationary frame, an optical assembly rotatably mounted on said frame, said assembly having a track means, a first lens mount fixed at one end of said track means, a second lens mount fixed at the distal end of said track means, each of said first and second lens mounts having one of first and second cylinder lenses supported therein, each of said first and second cylinder lenses having an axis of cylinder positioned in a first plane containing said other principal meridian, a carriage slidably mounted on said track, a third cylinder lens supported by said carriage, said third cylinder lens having an axis of cylinder normal to said first plane and in a second plane with said one principal meridian, said first and second cylinder lenses having a combined cylinder power, said third cylinder lens having a cylinder power substantially equal to said combined cylinder power, a rotatable threaded member mounted on said frame and extending parallel to said track, a follower connected to said carriage and operably engaging said member to position said carriage at a selected location, a motor including control means operably connected to said member and a motor and control means for selectively rotating said optical assembly, whereby the cylindrical focal power along said one principal meridian in said optical system can be varied by sliding said carriage along said track and said one principal meridian can be oriented by rotating said assembly.

2. Apparatus according to claim 1 wherein said track means comprises at least two parallel rods extending between said first and second lens mounts.

3. Apparatus according to claim 1 wherein said first lens has a cylindrical power of about 2 diopters, said second lens has a cylindrical power of about 1.5 diopters and said third lens has a cylindrical power of about 3 diopters.

4. Apparatus according to claim 1 wherein said track means includes a cylindrical housing.

* * * * *